US011885168B2

(12) United States Patent
Romero et al.

(10) Patent No.: US 11,885,168 B2
(45) Date of Patent: Jan. 30, 2024

(54) SLIDING BARRIER TRACKING SYSTEM

(71) Applicant: OVERHEAD DOOR CORPORATION, Lewisville, TX (US)

(72) Inventors: Federico Romero, Corpus Christi, TX (US); David Paul Hewitt, Lewisville, TX (US)

(73) Assignee: Overhead Door Corporation, Lewisville, TX (US)

(*) Notice: Subject to any disclaimer, the term of this patent is extended or adjusted under 35 U.S.C. 154(b) by 290 days.

(21) Appl. No.: 17/367,541

(22) Filed: Jul. 5, 2021

(65) Prior Publication Data

US 2021/0332632 A1 Oct. 28, 2021

Related U.S. Application Data

(62) Division of application No. 15/950,829, filed on Apr. 11, 2018, now Pat. No. 11,053,725.

(60) Provisional application No. 62/484,215, filed on Apr. 11, 2017.

(51) Int. Cl.

*E05F 15/41* (2015.01)
*E05F 15/643* (2015.01)
*E05D 15/06* (2006.01)

(52) U.S. Cl.

CPC .......... *E05F 15/41* (2015.01); *E05D 15/0621* (2013.01); *E05F 15/643* (2015.01); *E05Y 2201/246* (2013.01); *E05Y 2400/508* (2013.01); *E05Y 2900/132* (2013.01)

(58) Field of Classification Search

CPC ......... E05F 15/41; E05F 15/643; E05F 15/70; E05F 15/40; E05F 15/632; E05F 15/42; E05F 15/73; E05F 15/668; E05F 15/655; E05F 15/603; E05F 15/60; E05F 17/004; E05F 1/025; E05D 15/0621; E05Y 2201/246; E05Y 2400/508

See application file for complete search history.

(56) References Cited

U.S. PATENT DOCUMENTS 757,178 A * 4/1904 Cross .................... E05F 15/643 49/102
4,893,435 A 1/1990 Stanely
5,347,755 A 9/1994 Jaster et al.
5,581,944 A 12/1996 Kornbrekke et al.
5,625,175 A 4/1997 Gutknecht et al.
5,625,266 A 4/1997 Stark
5,711,112 A 1/1998 Barten et al.
5,884,237 A 3/1999 Kanki et al.
(Continued)

*Primary Examiner* — Justin B Rephann
(74) *Attorney, Agent, or Firm* — Haynes and Boone, LLP

(57) ABSTRACT

Disclosed herein is a sliding door system including a motor, a driveshaft coupled to the motor, and a coupling mechanism fastened to the sliding door. The coupling mechanism is configured to convert rotation of the driveshaft into linear motion of the sliding door, such that movement of the coupling mechanism is directly correlated to movement of the sliding door. The sliding door system also includes a rotary encoder, a belt mechanically coupled to the coupling mechanism. The belt, as moved by the coupling mechanism, is configured to turn the rotary encoder as the sliding door moves, such that movement of the rotary encoder is directly correlated to movement of the sliding door and not directly correlated to movement of the motor and driveshaft.

15 Claims, 5 Drawing Sheets

(56) References Cited

U.S. PATENT DOCUMENTS 6,087,794 A * 7/2000 Kawanobe .............. E05F 15/70 318/446
6,208,102 B1 3/2001 Kikuchi
6,304,178 B1 10/2001 Hayashida
6,352,097 B1 3/2002 Kern
7,156,447 B2 1/2007 Watanabe
7,503,434 B2 * 3/2009 Grundmann ............ B66B 13/14 187/316
7,644,808 B2 1/2010 Yoshikawa
8,113,263 B2 * 2/2012 Reed ....................... E05F 15/40 160/310
8,640,561 B2 * 2/2014 Harie .................... E05F 15/635 74/421 A
8,643,321 B2 * 2/2014 Leivenzon ................ E06B 9/72 318/463
9,534,882 B2 * 1/2017 Ludwig .................. H02K 11/21
9,759,004 B2 * 9/2017 Uno ...................... E05F 15/632
9,834,976 B2 * 12/2017 Balder ................... G05B 15/02
10,000,960 B2 * 6/2018 Angiuli .................. E05F 15/40
10,392,854 B2 * 8/2019 Ottmann ............. E05D 15/0652
2002/0157317 A1 10/2002 Valencia et al.
2004/0046401 A1 3/2004 Watanabe
2004/0074046 A1 4/2004 Mimnaugh
2005/0062453 A1 * 3/2005 Sato ........................ E05F 15/60 318/802
2005/0274078 A1 12/2005 Gilchrist
2006/0070821 A1 4/2006 Grundmann
2007/0000622 A1 * 1/2007 Reed ....................... E05F 15/40 160/188
2009/0266185 A1 * 10/2009 Harie .................... E05F 15/635 74/29
2013/0314019 A1 * 11/2013 Wilmes ............... E05D 13/1261 318/470
2014/0035506 A1 * 2/2014 Ludwig .................. G01B 7/003 310/68 B
2015/0054294 A1 2/2015 Uno et al.
2015/0316915 A1 * 11/2015 Balder ................... G05B 15/02 49/358
2016/0024832 A1 1/2016 Hall et al.
2017/0037671 A1 * 2/2017 Angiuli ............... E05D 13/1215
2017/0234055 A1 * 8/2017 Ottmann ............... E05F 15/643 49/31
2018/0298671 A1 * 10/2018 Roppongi ............. E05F 15/659

* cited by examiner

SLIDING BARRIER TRACKING SYSTEM

CROSS-REFERENCE TO RELATED APPLICATION

This application is a divisional of U.S. patent application Ser. No. 15/950,829 filed Apr. 11, 2018 which claims priority to and the benefit of U.S. Provisional Patent Application No. 62/484,215 filed Apr. 11, 2017, which are hereby incorporated by reference herein in their entirety for all purposes.

TECHNICAL FIELD

This disclosure relates to the field of sliding barrier position detection systems, and more particularly, to a sliding barrier position detection system that determines the position of the sliding barrier in a way that is decoupled from an operator.

BACKGROUND

Conventional sliding barrier systems typically include one or more sliding doors mounted in a track directing movement of the sliding barriers between open and closed positions, and such barrier systems may be manually or automatically operated. Manually operated door systems tend to be inefficient and slow as they require a user to move the barrier between both open and closed positions. In settings requiring quick, efficient door operation such as, for example, in a medical facility, manually operated sliding barrier may be impractical.

Automatically operated sliding barrier systems may address some of the deficiencies of manually operated sliding barrier systems; however, in the addressing of those deficiencies, concerns arise. For example, since automatically operated sliding barrier systems are operated independently of users of the barrier, mechanisms should be in place for determining the position of the barrier so as to provide feedback for the control circuitry.

Therefore, further development of automatically operated sliding barrier systems is needed.

SUMMARY

Briefly described, the present disclosure provides for the detection of the true position of a sliding barrier, and includes the use of an encoder or other device to measure the actual distance traveled or position of the barrier in a manner that is not directly related to a position or status of the drive mechanism for the barrier itself.

In greater detail, the disclosure includes a sliding barrier that is moved between open and closed positions via a driveshaft coupled to a motor. The driveshaft is mechanically coupled to the barrier via a coupling mechanism, such as a clutch. A rotary encoder is turned by a belt and pulley system that is coupled to the sliding barrier itself, and that is not directly coupled to the driveshaft or the motor. Stated another way, the movement of the belt is not directly linked to the driveshaft, such that in some scenarios (for example, where the clutch is slipping), the belt may remain stationary while the driveshaft is spinning.

A barrier operating system is provided. The barrier operating system may include a barrier operator, a position detector, and a control circuitry. In various instances, the barrier operator may be configured to move a barrier, the position detector may be mechanically coupled to the barrier, mechanically operated by movement of the barrier, and configured to generate a position output as a function of movement of the barrier. In various instances, the control circuitry may be configured to determine a position of the barrier as a function of the position output.

In various embodiments, the position detector is not mechanically coupled to the barrier operator such that there is no direct correlation between an operating status of the barrier operator and the position output generated by the position detector. Moreover, the position detector may include a rotary encoder.

In various embodiments, the barrier operating system may include a pulley mechanically coupled to the barrier and a belt mechanically coupling the pulley to the rotary encoder. Moreover, the barrier operator may include further aspects. For example, the barrier operator may include an electric motor, a driveshaft coupled to the electric motor, and a coupling mechanism mechanically coupling the driveshaft to the barrier such that rotation of the driveshaft by the electric motor causes movement of the barrier. The barrier operator may include a clutch mechanically coupling the driveshaft to the barrier and configured to decouple rotation of the driveshaft from movement of the barrier when torque applied by the driveshaft to the clutch exceeds a threshold. Furthermore, rotation of the driveshaft by the electric motor, in various embodiments, is not directly correlated to the position output generated by the position detector. Yet further, in various instances, the barrier includes a horizontally sliding door.

Furthermore, the control circuitry may also have further aspects. For instance, the control circuitry may be configured to control the barrier operator based on the position of the barrier. Also, the barrier operator may include a motor, wherein the control circuitry controls a speed of the motor based on the position of the barrier. In certain instances, the control circuitry controls the motor so as to move the barrier between open and closed positions, and the control circuitry controls the speed of the motor so as to decrease as the barrier moves within a threshold distance of the closed position.

A sliding door system is provided. The sliding door system may include a motor, a driveshaft, a coupling mechanism, a rotary encoder, and a belt. In various instances, the driveshaft may be coupled to the motor. Moreover, the coupling mechanism may be fastened to the sliding door and configured to convert rotation of the driveshaft into linear motion of the sliding door, such that movement of the coupling mechanism is directly correlated to movement of the sliding door. The belt may be mechanically coupled to the coupling mechanism and configured to turn the rotary encoder as the sliding door moves, such that movement of the rotary encoder is directly correlated to movement of the sliding door and not directly correlated to movement of the motor and driveshaft.

In various embodiments of the sliding door system, the coupling mechanism includes a clutch configured to mechanically couple the driveshaft to the sliding door when torque output by the driveshaft is below a threshold, and also configured to decouple the driveshaft from the sliding door when the torque output from the driveshaft is above a threshold. The belt and the rotary encoder may be cogged.

A method of providing a barrier operating system is disclosed. The method may include providing a barrier operator configured to move a barrier and providing a position detector mechanically coupled to the barrier, mechanically operated by movement of the barrier, and configured to generate a position output as a function of movement of the barrier. The method may also include providing control circuitry configured to determine a position of the barrier as a function of the position output.

Additionally, the position detector is, in various embodiments, not mechanically coupled to the barrier operator such that there is no direct correlation between an operating status of the barrier operator and the position output generated by the position detector.

Furthermore, the method may also include providing a pulley mechanically coupled to the barrier and a belt mechanically coupling the pulley to the rotary encoder.

In various instances, the providing the barrier operator includes providing an electric motor, providing a driveshaft coupled to the electric motor, and providing a coupling mechanism mechanically coupling the driveshaft to the barrier such that rotation of the driveshaft by the electric motor causes movement of the barrier.

Also, providing the barrier operator may also include providing a clutch mechanically coupling the driveshaft to the barrier and configured to decouple rotation of the driveshaft from movement of the barrier when torque applied by the driveshaft to the clutch exceeds a threshold. Rotation of the driveshaft by the electric motor may be not directly correlated to the position output generated by the position detector.

DETAILED DESCRIPTION

In the following detailed description and the attached drawings, numerous specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the understanding of persons of ordinary skill in the relevant art.

Figure 1:
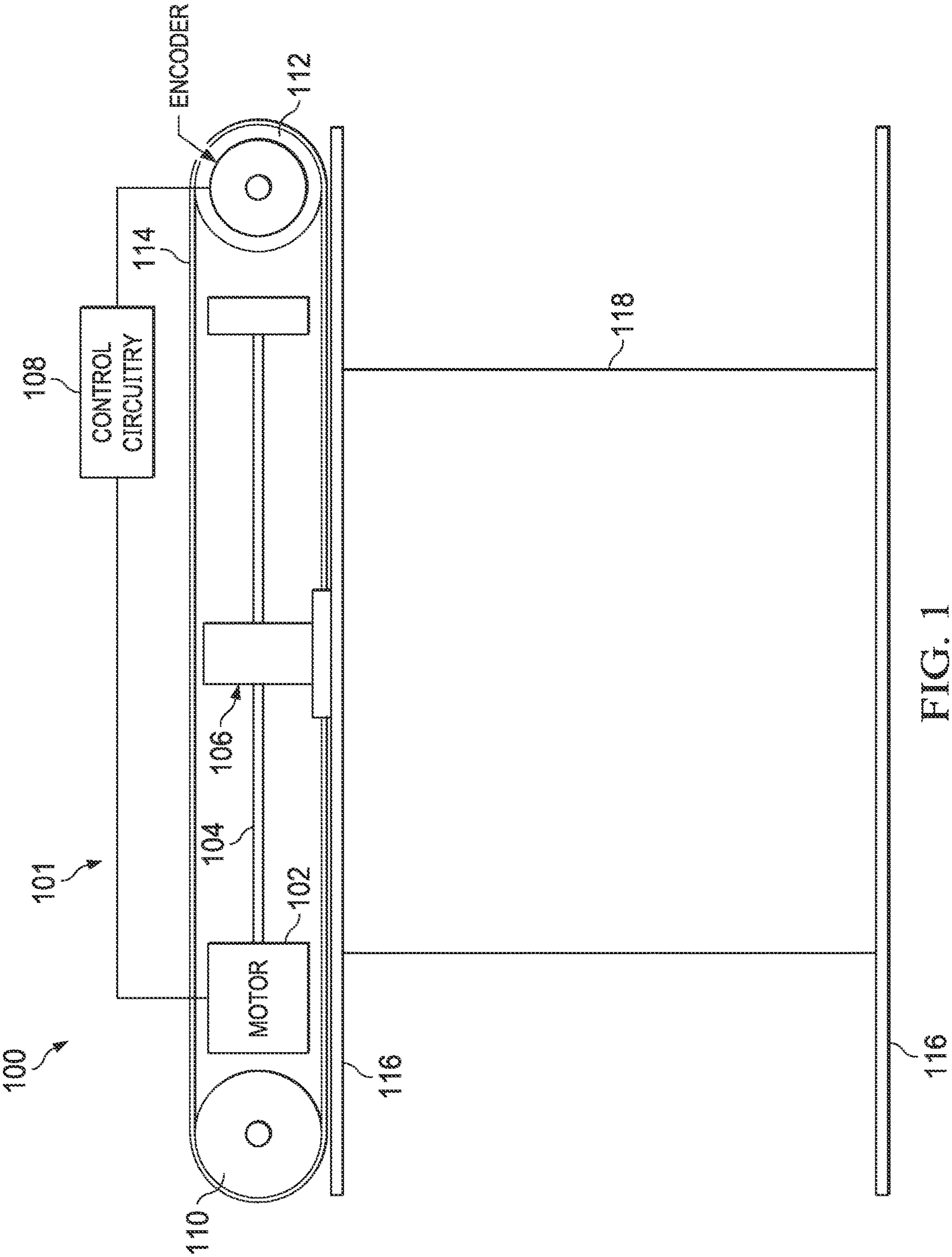
FIG. 1 is a block diagram of a barrier operating system in accordance with this disclosure.
Figure 2:
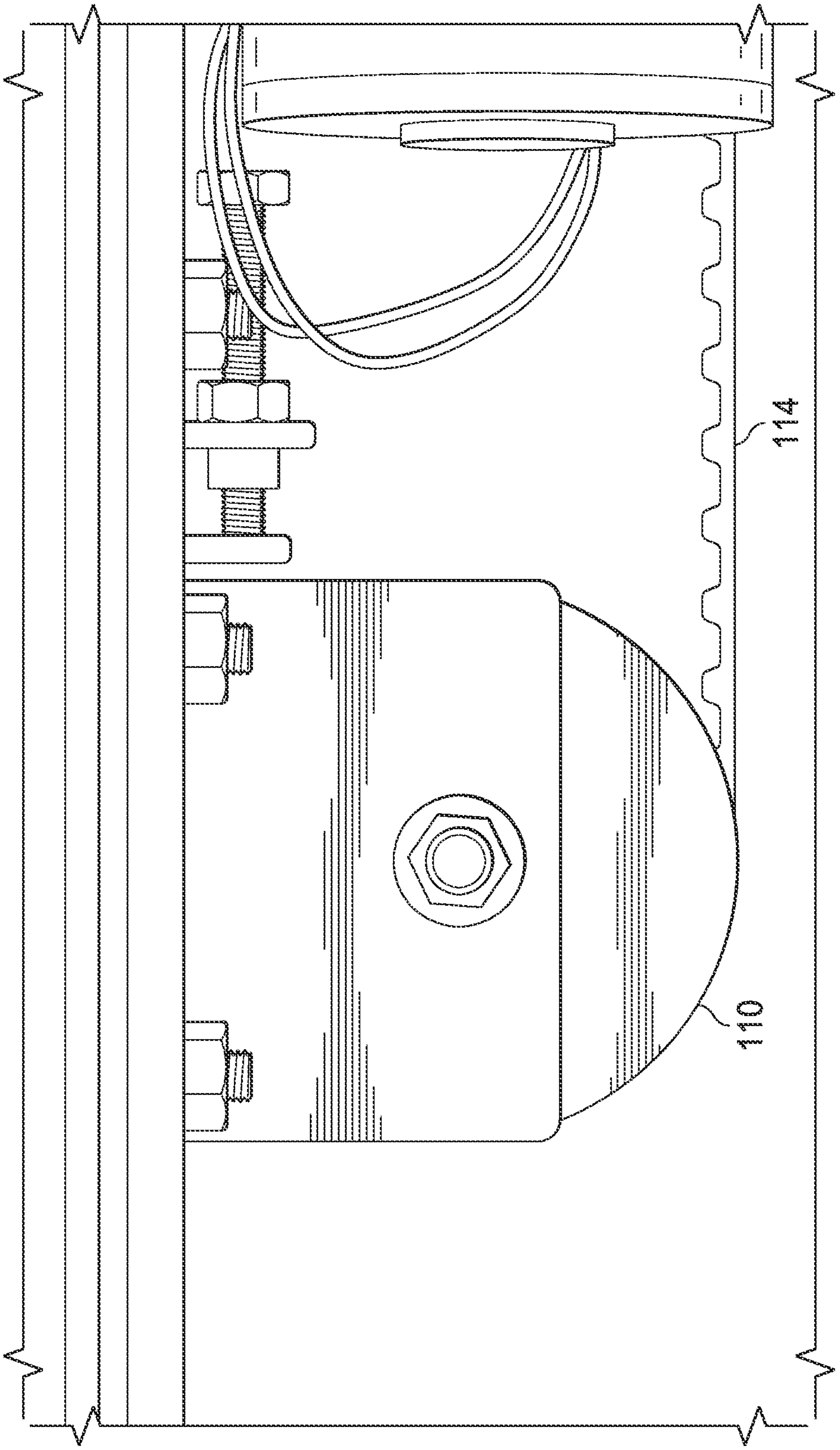
FIG. 2 is a close up front view of the pulley of the barrier operating system of FIG. 1.
Figure 3:
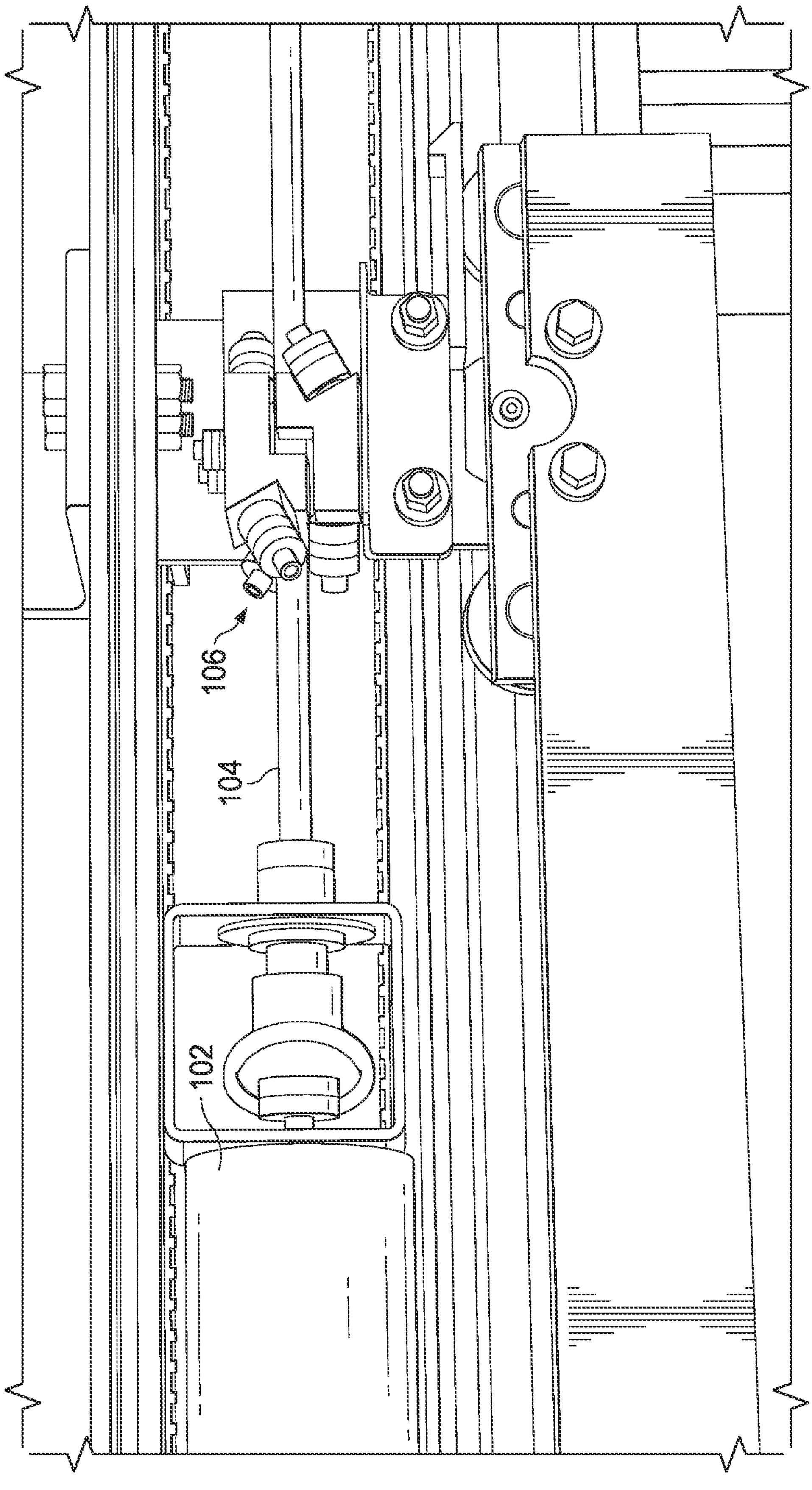
FIG. 3 is a front view of the motor, driveshaft, and coupling mechanism of the barrier operating system of FIG. 1.
Figure 4:
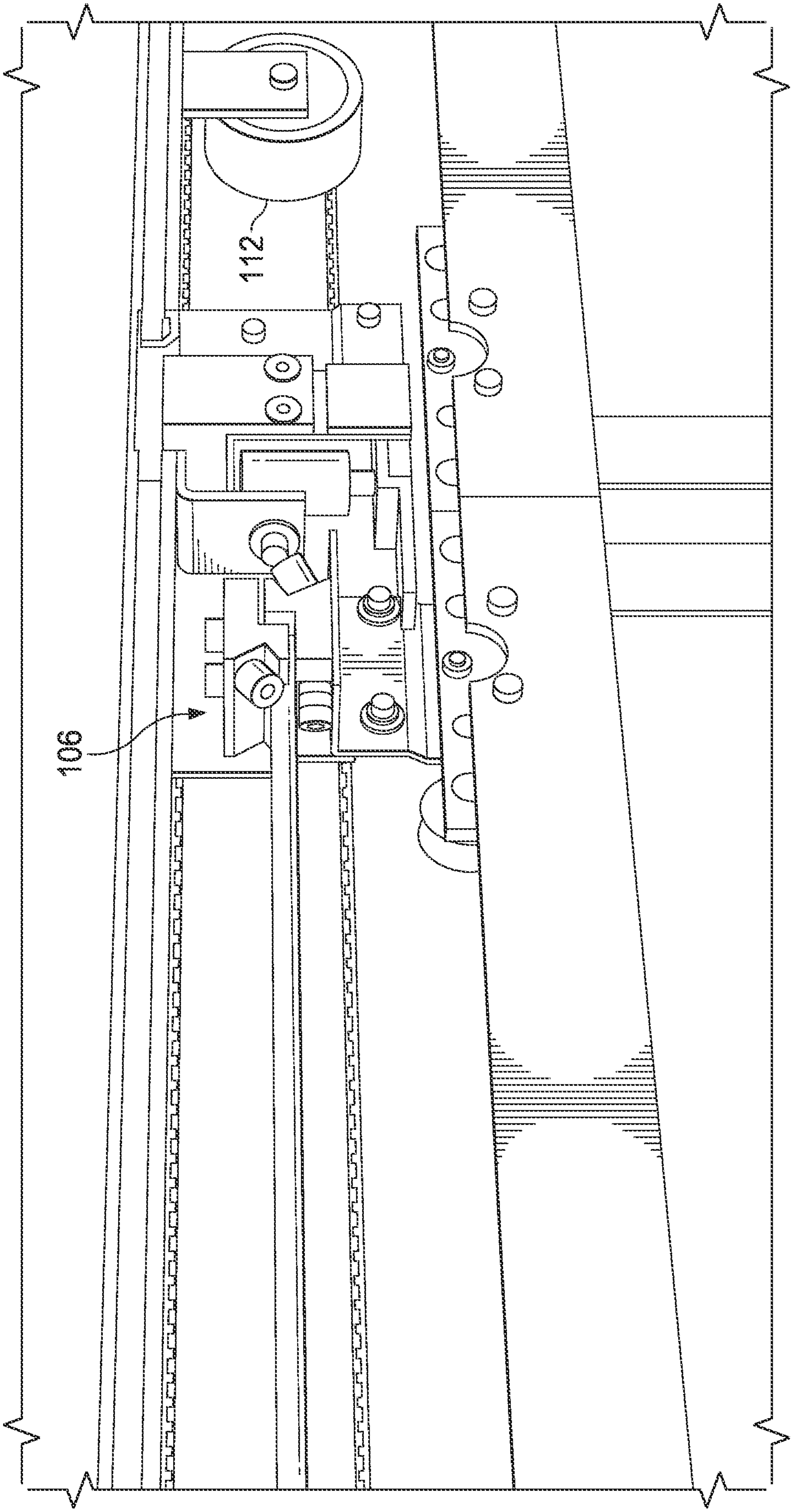
FIG. 4 is a front view of the driveshaft, coupling mechanism, and rotary encoder of the barrier operating system of FIG. 1.
Figure 5:
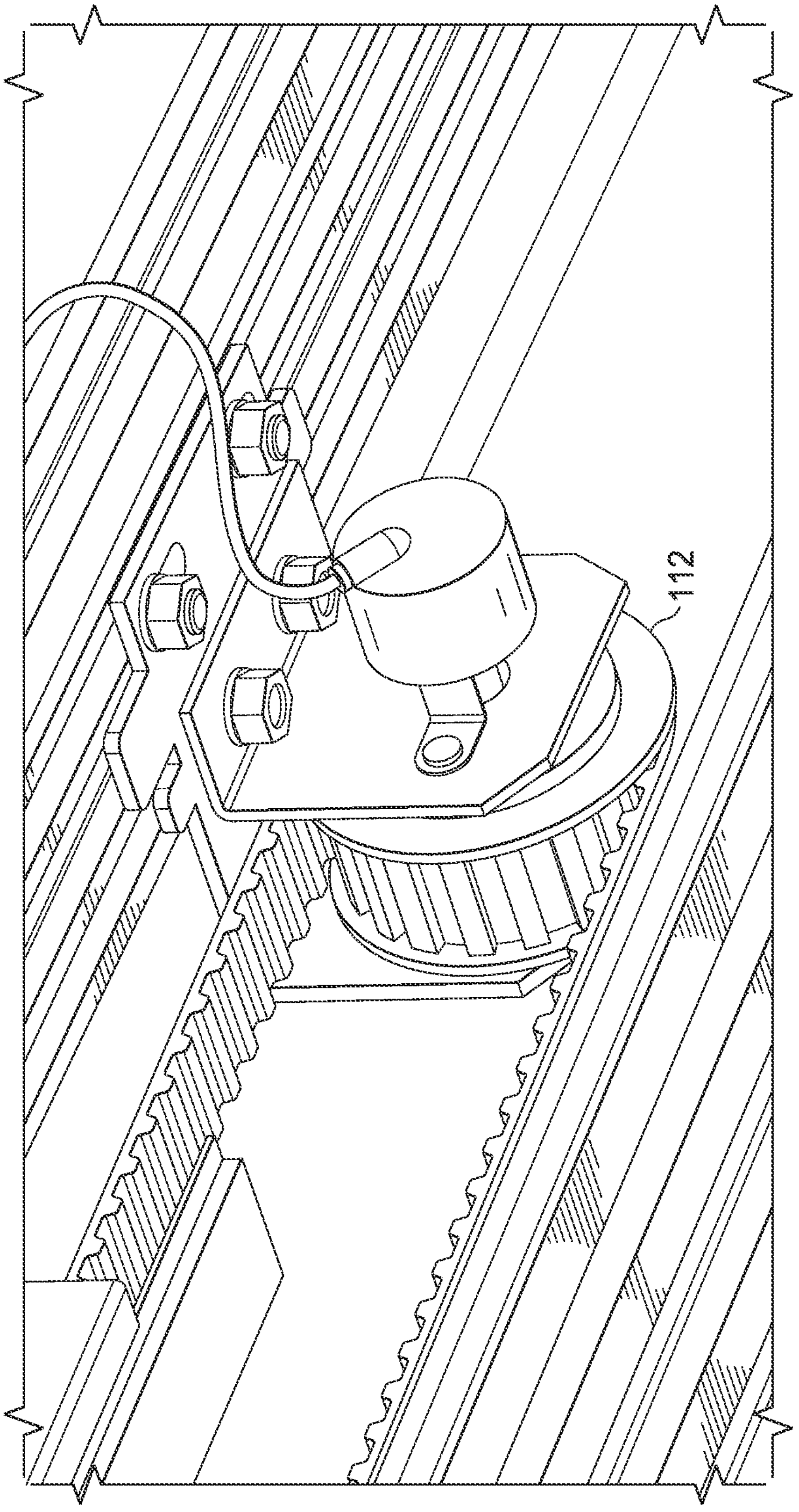
FIG. 5 is a close up front view of the rotary encoder of the barrier operating system of FIG. 1.

With reference to FIGS. 1-5, but with particular emphasis on FIG. 1, a barrier operating system 100 is now described. The barrier operating system 100 includes a sliding door 118 that rides on rails 116. A barrier operator 101 actuates the sliding door 118 and moves it along the rails 116.

The barrier operator 101 includes a motor 102 which is mechanically coupled to a driveshaft 104. A coupling mechanism 106 couples the driveshaft 104 to the sliding door 118, and converts rotational motion of the driveshaft 104 into linear motion to move the sliding door 118. The coupling mechanism 106 includes a clutch that slips when a predetermined level of torque is applied by the driveshaft 104, thereby mechanically decoupling the driveshaft 104 from the sliding door 118.

Since the coupling mechanism 106 itself is physically connected to the sliding door 118, linear movement of coupling mechanism 106 equates to linear movement of the sliding door 118. Linear movement of the coupling mechanism 106, and thus linear movement of the sliding door 118, moves a belt 114 stretched between a pulley 110 and rotary encoder 112. Thus, movement of the sliding door 118 causes rotation of the rotary encoder 112, via movement of the belt 114. Based on this movement, the rotary encoder 112 generates a position output signal, which is used by control circuitry 108 to determine the position of the sliding door 118.

It should be understood that that the movement of the rotary encoder 112 is completely decoupled from movement of the driveshaft 104 and motor 102 such that the driveshaft 104 and motor 102 may turn without any movement (or change in output) of the rotary encoder 112 occurring as a result, such as may happen when the clutch of the coupling mechanism 106 slips. That is, there is no direct correlation between movement of the driveshaft 104 and motor 102 and movement (or change in output) of the rotary encoder 112, while movement of the sliding door 118 itself directly correlates to movement (or change in output) of the rotary encoder 112.

This setup provides for precise determination of the actual location of the sliding door 118 by the control circuitry 108, contrary to prior art setups which include a direct correlation between movement of their driveshafts or motors and their rotary encoders. The control circuitry 108 is coupled to the motor 102 for control thereof, and controls the motor 102 so as to move the sliding door 118 between open and closed positions. Through knowledge of the precise location of the sliding door 118, the control circuitry 108 can control the motor 102 such that the speed of the sliding door 118 decreases as the position of the door on its route from the open position to the closed position crosses a threshold distance. Indeed, through this knowledge of the precise location of the sliding door 118, the control circuitry 108 can affect any desired control of the speed of the motor 102 such that the sliding door 118 travels at any desired speed at any desired point along its route from the open position to the closed position.

Various adaptations and alterations may be made to the various embodiments provided herein without departing from the spirit and scope of the present disclosure as set forth in the claims provided below. For example, while the barrier operating system 100 is described above as having a sliding door 118, any form of sliding barrier may be used, and that sliding barrier may open horizontally or vertically. In addition, while the barrier operating system 100 has been described as utilizing a rotary encoder 112, any position determining device that receives a mechanical input and provides an electrical output may be used. In accordance with FIGS. 1-5, but as specifically illustrated in FIGS. 2 and 5, the belt 114 may be cogged, together with the rotary encoder 112 and pulley 110, so as to preclude slipping of the belt 114 with respect to the rotary encoder 112. Moreover, further specific illustration of aspects of the motor 102, the driveshaft 104, and the coupling mechanism 106 are emphasized in FIGS. 3 and 4 which depict a coupling mechanism 106 at different positions along a range of travel. Thus one may appreciate that while various figures are referenced individually and/or in combination with other figures, various embodiments are contemplated including some or all of the features of each of FIGS. 1-5 in combination with some or all of the features of other figures from among FIGS. 1-5.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

We claim:

1. A sliding door system comprising:

a motor;

a driveshaft coupled to the motor;

a coupling mechanism fastened to a sliding door and configured to convert rotation of the driveshaft into linear motion of the sliding door, such that movement of the coupling mechanism is directly correlated to movement of the sliding door;

a rotary encoder; and a belt mechanically coupled to the coupling mechanism and configured to turn the rotary encoder as the sliding door moves, such that movement of the rotary encoder is directly correlated to the movement of the sliding door and not directly correlated to movement of the motor and the driveshaft.

2. The sliding door system of claim 1, wherein the coupling mechanism includes a clutch configured to mechanically couple the driveshaft to the sliding door when torque output by the driveshaft is below a threshold and configured to decouple the driveshaft from the sliding door when the torque output from the driveshaft is above a threshold.

3. The sliding door system of claim 1, wherein the belt and the rotary encoder are cogged.

4. The sliding door system of claim 1, further comprising control circuitry configured to determine a position of the sliding door as a function of a position output of the rotary encoder.

5. The sliding door system of claim 4, wherein the control circuitry is configured to alter a speed of the sliding door based on the determined position of the sliding door.

6. The sliding door system of claim 1, wherein the sliding door is configured to open horizontally.

7. A barrier operating system comprising:

a motor;

a driveshaft coupled to the motor;

a coupling mechanism comprising a clutch fastened to a slidable barrier;

a rotary encoder mechanically coupled to the slidable barrier, mechanically operated by sliding movement of the slidable barrier, and configured to generate a position output as a function of movement of the slidable barrier, wherein the rotary encoder is mechanically decouplable from the motor such that there is no direct correlation between movement of the motor and the position output generated by the rotary encoder; and control circuitry configured to determine a position of the slidable barrier as a function of the position output.

8. The barrier operating system of claim 7, wherein the clutch is configured to decouple rotation of the driveshaft from movement of the slidable barrier when torque applied by the driveshaft to the clutch exceeds a threshold.

9. The barrier operating system of claim 8, wherein rotation of the driveshaft by the motor is not directly correlated to the position output generated by the rotary encoder.

10. The barrier operating system of claim 7, wherein the control circuitry controls a speed of the motor based on the position of the slidable barrier.

11. The barrier operating system of claim 10, wherein the control circuitry controls the motor so as to move the slidable barrier between open and closed positions, and wherein the control circuitry controls the speed of the motor so as to decrease as the slidable barrier moves within a threshold distance of the closed position.

12. The barrier operating system of claim 7, further comprising a belt mechanically coupled to the coupling mechanism and configured to turn the rotary encoder as the slidable barrier and the coupling mechanism move.

13. The barrier operating system of claim 12, further comprising a pulley wherein the belt extends between the rotary encoder and the pulley.

14. A barrier operating system comprising:

a motor;

a driveshaft coupled to the motor;

a coupling mechanism comprising a clutch fastened to a slidable barrier such that the clutch moves translationally with the slidable barrier;

a rotary encoder mechanically operated by movement of the slidable barrier and configured to generate a position output as a function of the movement of the slidable barrier; and control circuitry configured to determine a position of the slidable barrier as a function of the position output.

15. The barrier operating system of claim 14, wherein the clutch is configured to decouple rotation of the driveshaft from movement of the slidable barrier when a torque applied by the driveshaft to the clutch exceeds a threshold.

* * * * *